United States Patent
Sato et al.

(10) Patent No.: US 11,034,165 B2
(45) Date of Patent: Jun. 15, 2021

(54) INK JET METHOD AND INK JET APPARATUS

(71) Applicant: Seiko Epson Corporation, Tokyo (JP)

(72) Inventors: Chigusa Sato, Shiojiri (JP); Midori Sekine, Matsumoto (JP); Kyohei Tanaka, Matsumoto (JP); Keitaro Nakano, Matsumoto (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/784,470

(22) Filed: Feb. 7, 2020

(65) Prior Publication Data

US 2020/0254784 A1 Aug. 13, 2020

(30) Foreign Application Priority Data

Feb. 8, 2019 (JP) .............................. JP2019-021244

(51) Int. Cl.
*B41J 2/15* (2006.01)
*B41J 2/21* (2006.01)
(Continued)

(52) U.S. Cl.
CPC .............. *B41J 11/002* (2013.01); *B41J 2/15* (2013.01); *B41J 2/2107* (2013.01); *C08L 39/04* (2013.01);
(Continued)

(58) Field of Classification Search
CPC ....... B41J 2/01; B41J 2/135; B41J 2/15; B41J 2/435; B41J 2/2107; B41J 11/002;
(Continued)

(56) References Cited

U.S. PATENT DOCUMENTS 7,741,380 B2 * 6/2010 Nakamura ............ B41C 1/1066
522/182
9,243,154 B2 * 1/2016 Nakano .................. C09D 11/30
(Continued)

FOREIGN PATENT DOCUMENTS

JP 2014-083804 A 5/2014
JP 2016-098324 A 5/2016

*Primary Examiner* — Anh T Vo
(74) *Attorney, Agent, or Firm* — Harness, Dickey & Pierce, P.L.C.

(57) ABSTRACT

An ink jet method includes: a discharging step of discharging a radiation-curable ink jet composition onto a recording medium at an ink weight per dot of 22 ng/dot or less by using an ink jet head having a nozzle density of 600 npi or more and configured to discharge the radiation-curable ink jet composition; and an irradiating step of irradiating, with radiation, the radiation-curable ink jet composition attached to the recording medium. The radiation-curable ink jet composition contains polymerizable compounds containing a monofunctional monomer and a multifunctional monomer. The monofunctional monomer includes a nitrogen-containing monofunctional monomer. The amount of the monofunctional monomer is 90 mass % or more relative to the total amount of the polymerizable compound. The amount of the nitrogen-containing monofunctional monomer is from 1 to 15 mass % relative to the total amount of the polymerizable compounds.

9 Claims, 1 Drawing Sheet

(51) Int. Cl.
 *B41J 11/00* (2006.01)
 *C09D 11/38* (2014.01)
 *C09D 11/322* (2014.01)
 *C09D 11/328* (2014.01)
 *C08L 39/04* (2006.01)

(52) U.S. Cl.
 CPC .......... *C09D 11/322* (2013.01); *C09D 11/328* (2013.01); *C09D 11/38* (2013.01)

(58) Field of Classification Search
 CPC ... B41M 7/0081; C08F 220/385; C08L 39/04; C08L 47/00; C09D 11/101; C09D 11/322; C09D 11/328; C09D 11/38; C09D 11/30; C09D 133/062
 See application file for complete search history.

(56) References Cited

U.S. PATENT DOCUMENTS

| | | | |
|---|---|---|---|
| 9,248,668 B2 | 2/2016 | Mochizuki et al. | |
| 2004/0099170 A1* | 5/2004 | Takabayashi | C09D 11/101 101/491 |
| 2011/0242243 A1* | 10/2011 | Miyabayashi | B41J 11/002 347/102 |

\* cited by examiner

INK JET METHOD AND INK JET APPARATUS

The present application is based on, and claims priority from JP Application Serial Number 2019-021244, filed Feb. 8, 2019, the disclosure of which is hereby incorporated by reference herein in its entirety.

BACKGROUND

1. Technical Field

The present disclosure relates to an ink jet method and an ink jet apparatus.

2. Related Art

Ink jet recording methods enable recording of high-definition images with relatively simple apparatuses and are rapidly developing in various fields. During development, various studies have been carried out to obtain images having good color reproduction and good granularity in a half tone section. For example, JP-A-2014-83804 discloses that the flexibility and curability of ink are achieved by controlling the content of N-vinyllactam and the particle size of a pigment, which prevents curved ink flying and makes ink flying speed uniform to form images having good color reproduction and good granularity in a half tone section. JP-A-2014-83804 also discloses that nozzles are arranged at intervals P in a first direction (sub-scanning direction) to form nozzle columns, and n number of nozzles columns that respectively discharge inks of N number of colors and correspond to the respective colors are offset from each other by P/N in the first direction. This configuration suppresses generation of gloss unevenness.

In the method described in JP-A-2014-83804, however, the pitch (interval) of the nozzles for the respective color heads is 100 dpi. It is thus difficult to perform high-speed printing for recording, for example, an image of 600 dpi in a single pass. If the discharged ink weight is high, there is a problem of smudged characters in printing small characters or the like. If the concentration of N-vinyllactam in the inks is high, the curability of the inks is too high, and there is also problem of low image quality.

SUMMARY

According to an aspect of the present disclosure, an ink jet method includes: a discharging step of discharging a radiation-curable ink jet composition onto a recording medium at an ink weight per dot of 22 ng/dot or less by using an ink jet head configured to discharge ink droplets at a resolution of 600 dpi or more in one scan; and an irradiating step of irradiating, with radiation, the radiation-curable ink jet composition attached to the recording medium. The radiation-curable ink jet composition contains polymerizable compounds including a monofunctional monomer and a multifunctional monomer. The monofunctional monomer includes a nitrogen-containing monofunctional monomer. The amount of the monofunctional monomer is 90 mass % or more relative to the total amount of the polymerizable compounds. The amount of the nitrogen-containing monofunctional monomer is from 1 to 15 mass % relative to the total amount of the polymerizable compounds.

In the ink jet method according to the present disclosure, the weighted mean of the glass transition temperatures of homopolymers of the polymerizable compounds with the content mass ratio of each of the polymerizable compounds taken as a weight may be 47° C. or higher.

In the ink jet method according to the present disclosure, the discharging step may involve discharging the radiation-curable ink jet composition from the ink jet head and attaching the radiation-curable ink jet composition to the recording medium while a carriage carrying the ink jet head and a radiation source disposed downstream of the ink jet head in the scanning direction is scanned in the width direction of the recording medium, and the irradiating step may involve irradiating the radiation-curable ink jet composition attached to the recording medium in the scanning with radiation from the radiation source in the same scanning as in the discharging step.

In the ink jet method according to the present disclosure, the nitrogen-containing monofunctional monomer may include either N-vinylcaprolactam or acryloylmorpholine.

In the ink jet method according to the present disclosure, the monofunctional monomer may include one or more selected from the group consisting of phenoxyethyl acrylate, isobornyl acrylate, t-butylcyclohexyl acrylate, dicyclopentenyl acrylate, and dicyclopentanyl acrylate.

In the ink jet method according to the present disclosure, ultraviolet radiation may be emitted from an ultraviolet light-emitting diode in the irradiating step.

According to an aspect of the present disclosure, an ink jet apparatus includes: an ink jet head having a nozzle density of 600 npi or more and configured to discharge a radiation-curable ink jet composition onto a recording medium at an ink weight per dot of 22 ng/dot or less; and a radiation source that emits radiation to the radiation-curable ink jet composition attached to the recording medium. The radiation-curable ink jet composition to be discharged contains polymerizable compounds containing a monofunctional monomer and a multifunctional monomer. The monofunctional monomer includes a nitrogen-containing monofunctional monomer. The amount of the monofunctional monomer is 90 mass % or more relative to the total amount of the polymerizable compounds. The amount of the nitrogen-containing monofunctional monomer is from 1 to 15 mas % relative to the total amount of the polymerizable compounds.

The ink jet apparatus according to the present disclosure may further include a carriage. The carriage carries the ink jet head. The ink jet head discharges the radiation-curable ink jet composition when the carriage is scanned in the width direction of the recording medium.

In the ink jet apparatus according to the present disclosure, the radiation source may be carried by a carriage and disposed adjacent to the ink jet head in a scanning direction of the ink jet head.

DESCRIPTION OF EXEMPLARY EMBODIMENTS

Embodiments of the present disclosure (hereinafter referred to as "embodiments") will be described below in detail with reference to the drawings as necessary. However, the present disclosure is not limited to these embodiments, and various modifications can be made without departing from the spirit or scope of the present disclosure. The same elements are denoted by the same reference characters in the drawings, and overlapping description is omitted. Unless otherwise specified, positional relationships, such as vertical and horizontal relationships, are based on the positional relationships shown in the drawings. Furthermore, the dimensional ratios in the drawings are not limited to those shown in the drawings.

As used herein, the term "(meth)acryloyl" refers to at least one of an acryloyl and the corresponding methacryloyl, the term "(meth)acrylate" refers to at least one of an acrylate and the corresponding methacrylate, and the term "(meth) acrylic" refers to at least one of acrylic and the corresponding methacrylic.

1. Ink Jet Method

An ink jet method according to an embodiment includes: a discharging step of discharging a heated predetermined radiation-curable ink jet composition (hereinafter also referred to simply as a "composition") by using a predetermined ink jet head and attaching the composition to a recording medium; and an irradiating step of irradiating the radiation-curable ink jet composition attached to the recording medium with radiation.

A known ink composition containing a large amount of nitrogen-containing monofunctional monomer is cured before ink droplets spread on a recording medium to generate unevenness from a microscopic viewpoint, resulting in low color development. This problem becomes particularly noticeable in high-speed printing at a low ink droplet weight. However, the ink jet method according to this embodiment uses a composition having a large proportion of monofunctional monomer and containing a small amount of nitrogen-containing monofunctional monomer. The susceptibility to oxygen inhibition is appropriately increased by controlling the amount of nitrogen-containing monofunctional monomer in this manner. This can maintain adhesion and rub fastness and enables a recorded article obtained by improving wet spreading after ink droplet landing to have good color development. The use of an ink jet head configured to perform printing at a predetermined dot density and discharge a predetermined ink droplet weight can further improve color development.

In the ink jet method according to this embodiment, the use of a predetermined ink jet head can stabilize temperature variations to maintain discharge stability and can achieve flexibility, adhesion, and rub fastness, which are original characteristics of the composition. Each step will be described below in detail.

1.1. Discharging Step

The discharging step involves discharging the heated composition from an ink jet head and attaching the composition to a recording medium. More specifically, the composition placed in a pressure-generating chamber of the ink jet head is discharged from nozzles by driving a pressure-generating unit. Such a discharging method is also referred to as an ink jet method.

Examples of an ink jet head 10 used in the discharging step include a line head for recording with a line system, and a serial head for recording with a serial system.

In the line system using a line head, for example, an ink jet head having a width equal to or more than the recoding width of a recording medium is fixed to an ink jet apparatus. The recording medium is then moved in the sub-scanning direction (the longitudinal direction or transport direction of the recording medium), and ink droplets are discharged from the nozzles of the ink jet head in conjunction with this movement. An image is recorded on the recording medium accordingly.

In the serial system using a serial head, for example, an ink jet head is carried by a carriage movable in the width direction of a recording medium. The carriage is then moved in the main-scanning direction (the transverse direction or width direction of the recording medium), and ink droplets are discharged from nozzle orifices of the head in conjunction with this movement. An image can be recorded on the recording medium accordingly.

In particular, in this embodiment, the radiation-curable ink jet composition is preferably discharged from the ink jet head and attached to a recording medium while a carriage carrying an ink jet head and radiation sources disposed downstream of the ink jet head in the main-scanning directions is scanned in the width direction of the recording medium.

Figure 1:
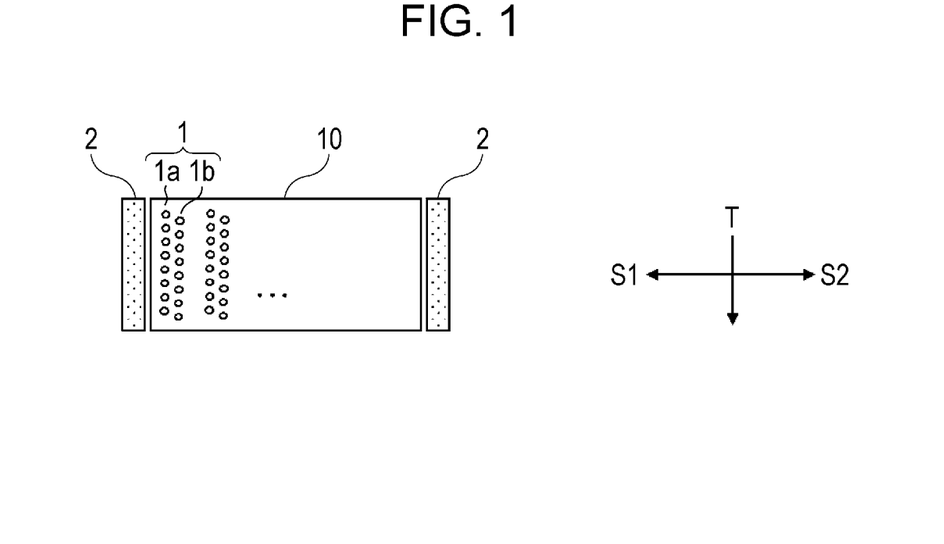
FIG. 1 is a schematic view for illustrating the structure of an ink jet head that may be used in an embodiment.

FIG. 1 is a schematic view for illustrating the structure of a carriage carrying an ink jet head 10 used in the serial system. The disposition of radiation sources 2 downstream of the ink jet head 10 in the main-scanning directions as shown in FIG. 1 enables discharge of the composition from nozzles 1 and irradiation of the discharged composition with radiation in one scan. This feature enables high-speed printing. In general, immediate irradiation of the discharged composition with radiation in this way may cause curing to proceed before the composition spreads in a wetting manner and may generate, on a recording medium, unevenness attributed to the composition to impair color development. In this embodiment, however, the susceptibility to oxygen inhibition is appropriately increased by controlling the amount of nitrogen-containing monofunctional monomer. This can provide a recorded article having good color development even by such high-speed printing.

Since the main-scanning directions of the carriage correspond the directions S1 and S2 as shown in FIG. 1, the "downstream in the main-scanning directions" refers to the both sides of the ink jet head 10.

The ink jet head used in this embodiment can discharge ink droplets at a resolution of 600 dpi or more in one scan, and the discharged ink weight per dot is 22 ng/dot or less. FIG. 1 is a schematic view for illustrating the structure of the ink jet head 10 used in the serial system. To enable discharge of ink droplets at a resolution of 600 dpi or more in one scan, the ink jet head may include nozzles at a nozzle density of 600 npi or more in one nozzle column or may include nozzles at a nozzle density of 600 npi or more such that two nozzle columns (1a, 1b) are offset from each other. The ink jet head according to this embodiment can discharge ink droplets at a resolution of 600 dpi or more in one scan for each color composition. This further improves the definition of the obtained recorded article.

The resolution in one scan is 600 dpi or more and preferably from 600 to 800 dpi. The term "in one scan" refers to one scan in which a recording medium is moved in the transport direction in the line system and refers to one scan in which a carriage is moved in the main-scanning direction in the serial system.

The ink weight per dot, namely, ink droplet weight, is preferably 22 ng/dot or less, more preferably 19 ng/dot or less, still more preferably 15 ng/dot or less, and yet still more preferably 10 ng/dot or less. In a piezoelectric drive system, the ink weight per dot can be controlled by changing the driving waveform applied to a piezoelectric element or by changing the nozzle diameter of the ink jet head or the volume between a nozzle and a pressure-generating unit which generates a driving force for discharging ink droplets.

In the discharging step, the composition may be discharged with heating. The heating temperature for the composition is preferably from 40° C. to 60° C., and more preferably from 40° C. to 50° C.

1.2. Irradiating Step

The irradiating step involves irradiating, with radiation, the radiation-curable ink jet composition attached to the recording medium. Upon irradiation with radiation, the monomer polymerization reaction starts, and the composition is cured to form a coating film. When a polymerization initiator is present at this time, the polymerization initiator generates an active species (initiation species), such as radical, acid, or base, and the monomer polymerization reaction is promoted by the function of the initiation species. When a photosensitizer is present, the photosensitizer absorbs radiation into an excited state, and the excited photosensitizer comes into contact with the polymerization initiator to promote the decomposition of the polymerization initiator, thus further achieving the curing reaction.

Examples of the radiation include ultraviolet radiation, infrared radiation, visible light, and X-rays. The composition is irradiated with radiation by using a radiation source disposed downstream of the ink jet head.

Examples of the radiation source include, but are not limited to, ultraviolet light-emitting diodes. The use of such a radiation source can downsize the apparatus and reduce costs. An ultraviolet light-emitting diode serving as an ultraviolet source is compact and thus can be installed into the ink jet apparatus. For example, an ultraviolet light-emitting diode can be installed into the carriage (both ends in the medium width direction, and/or medium transport direction side) carrying the ink jet head which discharges the radiation-curable ink jet composition.

In particular, the irradiating step preferably includes, by using a carriage as shown in FIG. 1, scanning for attaching the composition to a recording medium and irradiation of the composition attached to the recording medium in the scanning with radiation from a radiation source in the same scanning as the scanning for attaching the composition to the recording medium. As described above, this feature achieves high-speed printing and enables the obtained recorded article to have high definition and high color development in this embodiment.

2. Radiation-Curable Ink Jet Composition

Next, the radiation-curable ink jet composition used in the ink jet method according to this embodiment will be described. The radiation-curable ink jet composition used in this embodiment contains polymerizable compounds including a monofunctional monomer and a multifunctional monomer. The monofunctional monomer includes a nitrogen-containing monofunctional monomer. The amount of the monofunctional monomer is 90 mass % or more relative to the total amount of the polymerizable compounds. The amount of the nitrogen-containing monofunctional monomer is from 1 to 15 mass % relative to the total amount of the polymerizable compounds.

The radiation-curable ink jet composition according to this embodiment is used to be discharged from the ink jet head by the ink jet method. A radiation-curable ink composition will be described below as an embodiment of the radiation-curable ink jet composition. However, the composition according to this embodiment may be a composition other than an ink composition and may be, for example, a composition used for 3D molding.

The radiation-curable ink jet composition according to this embodiment is cured by irradiation with radiation. Examples of the radiation include ultraviolet radiation, infrared radiation, visible light, and X-rays. The radiation is preferably ultraviolet radiation because a radiation source is easily available and widely used, and materials suitable for curing by irradiation with ultraviolet radiation are easily available and widely used.

Possible components, physical properties, and a manufacture method for the radiation-curable ink jet composition according to this embodiment will be described below.

2.1. Polymerizable Compound

The polymerizable compounds include a monofunctional monomer having one polymerizable functional group and a multifunctional monomer having multiple polymerizable functional groups. As necessary, the polymerization compounds may include an oligomer having one or more polymerizable functional groups. Each polymerizable compound may be used alone or in combination of two or more.

In this embodiment, the weighted mean of the glass transition temperatures of homopolymers of the polymerizable compounds with the content mass ratio of each of the polymerizable compounds taken as a weight is 47° C. or higher, preferably 48° C. or higher, and more preferably 49° C. or higher. When the weighted mean of the glass transition temperatures is 47° C. or higher, the rub fastness of the coating film at room temperature can be improved. The upper limit of the weighted mean of the glass transition temperatures is preferably, but not necessarily, 65° C. or lower, more preferably 60° C. or lower, and still more preferably 55° C. or lower.

The method for calculating the weighted mean of glass transition temperatures will be described. The weighted mean of glass transition temperatures is represented by $Tg_{All}$, the glass transition temperature of the homopolymer of each of the polymerizable compounds is represented by $Tg_N$, and the content mass ratio of the polymerizable compound is represented by $X_N$ (mass %). N is a number in ascending order from 1 depending on the number of monomers contained in the radiation-curable ink jet composition. For example, in the case of using three monomers, $Tg_1$, $Tg_2$, $Tg_3$ are generated. The glass transition temperature of the homopolymer of each of the polymerizable compounds is available from the safety data sheet (SDS) or catalog information for the polymerizable compound. The weighted mean $Tg_{All}$ of glass transition temperatures is the sum of the products of the content $X_N$ and the glass transition temperature $Tg_N$ calculated for the monomers. The following formula (2) is thus satisfied.

$$Tg_{All} = \Sigma Tg_N \times X_N \qquad (2)$$

The weighted mean of the glass transition temperatures can be controlled by the glass transition temperatures of the polymerizable compounds used and the content mass ratio of the polymerizable compounds used.

2.1.1. Monofunctional Monomer

The monofunctional monomer according to this embodiment includes a nitrogen-containing monofunctional monomer and, as necessary, may further include a monofunctional acrylate having a polycyclic hydrocarbon group, an aromatic group-containing monofunctional monomer, a saturated aliphatic group-containing monofunctional monomer, or other monomers. The monofunctional monomer may further include other monofunctional monomers as necessary. Examples of other monofunctional monomers that can be used include, but are not limited to, conventionally known monofunctional monomers having polymerizable functional groups, particularly, polymerizable functional groups having an unsaturated carbon-carbon double bond.

The amount of the monofunctional monomer is 90 mass % or more relative to the total amount of the polymerizable compounds. When the amount of the monofunctional monomer is 90 mass % or more relative to the total amount of the polymerizable compounds, the adhesion is further improved. In particular, the adhesion to a polypropylene or aluminum substrate or the like which is normally unlikely to exhibit adhesion is also improved. The upper limit of the amount of the monofunctional monomer is preferably, but not necessarily, 99 mass % or less, more preferably 98 mass % or less, and still more preferably 97 mass % or less, relative to the total amount of the polymerizable compounds. When the amount of the monofunctional monomer is 99 mass % or less relative to the total amount of the polymerizable compounds, the rub fastness tends to be further improved.

The amount of the monofunctional monomer is preferably 70 mass % or more, more preferably 72 mass % or more, and still more preferably 74 mass % or more, relative to the total amount of the composition. When the amount of the monofunctional monomer is 70 mass % or more relative to the total amount of the composition, the adhesion tends to be further improved. The upper limit of the amount of the monofunctional monomer is preferably 92 mass % or less, more preferably 90 mass % or less, and still more preferably 88 mass % or less, relative to the total amount of the composition. When the amount of the monofunctional monomer is 92 mass % or less relative to the total amount of the composition, the rub fastness tends to be further improved.

Examples of the monofunctional monomer are illustrated below, but the monofunctional monomer in this embodiment is not limited to the following monomers.

2.1.1.1. Nitrogen-Containing Monofunctional Monomer

Examples of the nitrogen-containing monofunctional monomer include, but are not limited to, nitrogen-containing monofunctional vinyl monomers, such as N-vinylcaprolactam, N-vinylformamide, N-vinylcarbazole, N-vinylacetamide, and N-vinylpyrrolidone; nitrogen-containing monofunctional acrylate monomers, such as acryloylmorpholine; and nitrogen-containing monofunctional acrylamide monomers, such as (meth)acrylamides, such as N-hydroxymethyl (meth)acrylamide, diacetone acrylamide, N,N-dimethyl (meth)acrylamide, and dimethylaminoethyl acrylate benzyl chloride quaternary salt.

Among these, any one of nitrogen-containing monofunctional vinyl monomers or nitrogen-containing monofunctional acrylate monomers is preferably contained; monomers having a nitrogen-containing heterocyclic structure, such as N-vinylcaprolactam, N-vinylcarbazole, N-vinylpyrrolidone, or acryloylmorpholine, are more preferred; and either N-vinylcaprolactam or acryloylmorpholine is still more preferably contained.

The use of such a nitrogen-containing monofunctional monomer tends to further improve the rub fastness of the coating film. Moreover, a nitrogen-containing monofunctional vinyl monomer having a nitrogen-containing heterocyclic structure, such as n-vinylcaprolactam, tends to further improve the flexibility of the coating film, and a nitrogen-containing monofunctional acrylate monomer having a nitrogen-containing heterocyclic structure, such as acryloylmorpholine, tends to further reduce the odor of the composition.

A nitrogen-containing monofunctional monomer is less susceptible to radical quenching by oxygen, and thus an ink composition containing a nitrogen-containing monofunctional monomer has good surface curability. In particular, when a small droplet of 22 ng/dot or less is discharged from the ink jet head and attached to a recording medium, the ratio of a portion of the ink droplet present in the surface is relatively large, and the droplet is susceptible to oxygen inhibition. However, the use of a nitrogen-containing monofunctional monomer minimizes the effect of oxygen and achieves good surface curability.

The amount of the nitrogen-containing monofunctional monomer is preferably from 1 to 15 mass %, more preferably from 5 to 15 mass %, and still more preferably from 10 to 15 mass %, relative to the total amount of the polymerizable compounds. When the amount of the nitrogen-containing monofunctional monomer relative to the total amount of the polymerizable compounds is in the above range, the odor is reduced, and the color development of the obtained recorded article and the rub fastness, curability, and adhesion of the coating film are further improved. The ink composition according to the present disclosure contains a nitrogen-containing monofunctional monomer. The nitrogen-containing monomer has high curability and, when exposed to radiation before the ink sufficiently spreads in a wetting manner, undergoes curing to generate surface unevenness, resulting in low color development. When the upper limit of the amount of the nitrogen-containing monofunctional monomer is 15 mass %, however, it is possible to ensure the time for ink wet spreading and obtain sufficient color development.

The amount of the nitrogen-containing monofunctional monomer is from 1 to 13 mass %, preferably from 4 to 13 mass %, and more preferably from 8 to 13 mass %, relative to the total amount of the composition. When the amount of the nitrogen-containing monofunctional monomer relative to the total amount of the composition is in the above range, the odor is reduced, and the color development of the obtained recorded article and the rub fastness, curability, and adhesion of the coating film are further improved.

2.1.1.2. Monofunctional Acrylate Having Polycyclic Hydrocarbon Group

Examples of other monofunctional monomers include monofunctional acrylates having a polycyclic hydrocarbon group. Examples of monofunctional acrylates having a polycyclic hydrocarbon group include, but are not limited to, acrylates having an unsaturated polycyclic hydrocarbon group, such as dicyclopentenyl acrylate and dicyclopentenyl oxyethyl acrylate; and acrylates having a saturated polycyclic hydrocarbon group, such as dicyclopentanyl acrylate and isobornyl acrylate. Among these, an acrylate having an unsaturated polycyclic hydrocarbon group is preferably contained, and at least dicyclopentenyl acrylate is more preferably contained. The use of such a monofunctional acrylate having a polycyclic hydrocarbon group tends to further improve the rub fastness of the coating film.

The amount of the monofunctional acrylate having a polycyclic hydrocarbon group is preferably from 25 to 55 mass %, more preferably from 30 to 50 mass %, and still more preferably from 35 to 45 mass %, relative to the total amount of the polymerizable compounds. When the amount of the monofunctional acrylate having a polycyclic hydrocarbon group relative to the total amount of the polymerizable compounds is in the above range, the rub fastness of the coating film tends to be further improved.

The amount of the monofunctional acrylate having a polycyclic hydrocarbon group is preferably from 15 to 45 mass %, more preferably from 20 to 40 mass %, and still more preferably from 25 to 35 mass %, relative to the total amount of the composition. When the amount of the monofunctional acrylate having a polycyclic hydrocarbon group relative to the total amount of the composition is in the above range, the rub fastness of the coating film tends to be further improved.

2.1.1.3. Aromatic Group-Containing Monofunctional Monomer

Examples of other monofunctional monomers include aromatic group-containing monofunctional monomers. In this embodiment, aromatic group-containing monofunctional monomers are not polycyclic hydrocarbon group-containing compounds.

Examples of the aromatic group-containing monofunctional monomer include, but are not limited to, phenoxyethyl (meth)acrylate, benzyl (meth)acrylate, alkoxylated 2-phenoxyethyl (meth)acrylate, ethoxylated nonylphenyl (meth) acrylate, alkoxylated nonylphenyl (meth)acrylate, p-cumylphenol EO-modified (meth)acrylate, and 2-hydroxy-3-phenoxypropyl (meth)acrylate. Among these monomers, phenoxyethyl (meth)acrylate and benzyl (meth)acrylate are preferred, phenoxyethyl (meth)acrylate is more preferred, and phenoxyethyl acrylate (PEA) is still more preferred. The use of such an aromatic group-containing monofunctional monomer tends to further improve the solubility of the polymerization initiator and further improve the curability of the composition. In particular, in the case of using an acylphosphine oxide polymerization initiator or a thioxanthone polymerization initiator, the solubility of such a polymerization initiator tends to be improved. The use of phenoxyethyl (meth)acrylate tends to further reduce odor.

Examples of the aromatic group-containing monofunctional monomer in other expression include compounds represented by general formula (3) below and compounds represented by general formula (4) below.

$$CH_2=CR^4—COOR^5—Ar \quad (3)$$

$$CH_2=CR^4—COO—Ar \quad (4)$$

In formulas (3) and (4) above, $R^4$ is a hydrogen atom or a methyl group. In formula (3) above, Ar represents an aromatic ring skeleton and is a monovalent organic residue that has at least one aryl group and in which a carbon atom of the aryl group is bonded to the group represented by $R^5$, and $R^5$ is a divalent organic residue having 1 to 4 carbon atoms. In formula (4) above, Ar represents an aromatic ring skeleton and is a monovalent organic residue that has at least one aryl group and in which a carbon atom of the aryl group is bonded to —COO— in the formula.

In general formula (3) above, preferred examples of the group represented by $R^5$ include an optionally substituted linear, branched, or cyclic alkylene group having 1 to 4 carbon atoms, and an optionally substituted alkylene group having 1 to 4 carbon atoms and having an oxygen atom of an ether bond and/or an ester bond in the structure. Among these groups, alkylene groups having 1 to 4 carbon atoms, such as an ethylene group, an n-propylene group, an iso-propylene group, and a butylene group; and alkylene groups having 1 to 4 carbon atoms and having an oxygen atom of an ether bond in the structure, such as an oxyethylene group, an oxy-n-propylene group, an oxyisopropylene group, and an oxybutylene group, are preferably used. When the organic residue is an optionally substituted group, examples of the substituent include, but are not limited to, a carboxyl group, an alkoxy group, a hydroxyl group, and a halo group. When the substituent is a group containing a carbon atom, the carbon atom is counted as the number of carbon atoms of the organic residue.

In general formulas (3) and (4) above, examples of the at least one aryl group included in Ar (aryl) (aromatic ring skeleton) include, but are not limited to, phenyl groups and naphthyl groups. The number of aryl groups is 1 or more and preferably 1 or 2. The aryl group may have a substituent at a carbon atom other than the following carbon atoms among the carbon atoms of the aryl group: the carbon atom bonded to the organic residue represented by $R^5$ in formula (3); the carbon atom bonded to —COO— in formula (4); and, when multiple aryl groups are present, the carbon atoms connecting the aryl groups. When the aryl group has a substituent, the number of substituents per aryl group is 1 or more and preferably 1 or 2. Examples of the substituent include, but are not limited to, linear, branched, or cyclic alkyl group, alkoxy group, carboxyl group, halo group, and hydroxyl group having 1 to 10 carbon atoms.

The amount of the aromatic group-containing monofunctional monomer is preferably from 30 to 55 mass %, more preferably from 35 to 50 mass %, and still more preferably from 40 to 45 mass %, relative to the total amount of the polymerizable compounds. When the amount of the aromatic group-containing monofunctional monomer relative to the total amount of the polymerizable compounds is in the above range, the odor tends to be further reduced, and the rub fastness of the coating film tends to be further improved.

The amount of the aromatic group-containing monofunctional monomer is preferably from 20 to 50 mass %, more preferably from 25 to 45 mass %, and still more preferably from 30 to 35 mass %, relative to the total amount of the composition. When the amount of the aromatic group-containing monofunctional monomer relative to the total amount of the composition is in the above range, the odor tends to be further reduced, and the rub fastness of the coating film tends to be further improved.

2.1.1.4. Saturated Aliphatic Group-Containing Monofunctional Monomer

Examples of other monofunctional monomers include saturated aliphatic group-containing monofunctional monomers. In this embodiment, saturated aliphatic group-containing monofunctional monomers are not polycyclic hydrocarbon group-containing compounds.

Examples of saturated aliphatic group-containing monofunctional monomers include, but are not limited to, alicyclic group-containing monofunctional monomers, such as tert-butylcyclohexanol acrylate (TBCHA) and 2-(meth) acrylic acid-1,4-dioxaspiro[4,5]dec-2-yl methyl; linear or branched aliphatic group-containing monofunctional monomers, such as isoamyl (meth)acrylate, stearyl (meth)acrylate, lauryl (meth)acrylate, octyl (meth)acrylate, decyl (meth)acrylate, isodecyl (meth)acrylate, isomyristyl (meth) acrylate, isostearyl (meth)acrylate, 2-hydroxybutyl (meth) acrylate, butoxyethyl (meth)acrylate, tetrahydrofurfuryl (meth)acrylate, 2-hydroxyethyl (meth)acrylate, 2-hydroxypropyl (meth)acrylate; and lactone-modified flexible (meth) acrylate. Among these, alicyclic group-containing monofunctional monomers are preferred. The use of such a saturated alicyclic group-containing monofunctional monomer tends to further improve the curability of the composition.

2.1.1.5. Others

Examples of other monofunctional monomers that may be used include, in addition to the foregoing monomers, unsaturated carboxylic acids, such as (meth)acrylic acid, itaconic acid, crotonic acid, isocrotonic acid, and maleic acid; salts of the unsaturated carboxylic acids; esters, urethanes, amides, and anhydrides of unsaturated carboxylic acids; acrylonitrile, styrene, various unsaturated polyesters, various unsaturated polyethers, various unsaturated polyamides, and various unsaturated urethanes.

Among the foregoing monomers, the composition preferably contains, as a monofunctional monomer, one or more selected from the group consisting of phenoxyethyl acrylate, isobornyl acrylate, t-butylcyclohexyl acrylate, dicyclopentenyl acrylate, and dicyclopentanyl acrylate. The presence of such a monofunctional monomer tends to reduce the odor and improve the color development of the obtained recorded article and the rub fastness, curability, and adhesion of the coating film.

2.1.2. Multifunctional Monomer

Examples of the multifunctional monomer according to this embodiment include vinyl ether group-containing (meth)acrylates, bifunctional (meth)acrylates, and tri- or higher-functional (meth)acrylates. The multifunctional monomer is not limited to the foregoing monomers.

The amount of the multifunctional monomer is preferably from 0.5 to 10 mass %, more preferably from 1 to 7.5 mass %, and still more preferably from 2 to 5 mass %, relative to the total amount of the polymerizable compounds. When the amount of the multifunctional monomer relative to the total amount of the polymerizable compounds is in the above range, the rub fastness and the adhesion tend to be further improved.

The amount of the multifunctional monomer is preferably from 0.5 to 10 mass %, more preferably from 1 to 7.5 mass %, and still more preferably from 2 to 5 mass %, relative to the total amount of the composition. When the amount of the multifunctional monomer relative to the total amount of the composition is in the above range, the rub fastness and the adhesion tend to be further improved.

Examples of the multifunctional monomer are illustrated below, but the multifunctional monomer in this embodiment is not limited to the following monomers.

2.1.2.1. Vinyl Ether Group-Containing (Meth)Acrylate

Examples of vinyl ether group-containing (meth)acrylates include, but are not limited to, compounds represented by formula (1) below. The presence of the vinyl ether group-containing (meth)acrylate tends to reduce the viscosity of the composition and further improve discharge stability. It is also possible to further improve the curability of the composition and further increase the recording speed as the curability is improved.

$$CH_2=CR^1—COOR^2—O—CH=CH—R^3 \quad (1)$$

wherein $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms.

Examples of the divalent organic residue having 2 to 20 carbon atoms and represented by $R^2$ in formula (1) above include an optionally substituted linear, branched, or cyclic alkylene group having 2 to 20 carbon atoms; an optionally substituted alkylene group having 2 to 20 carbon atoms and having an oxygen atom of an ether bond and/or an ester bond in the structure; and an optionally substituted divalent aromatic group having 6 to 11 carbon atoms. Among these groups, alkylene groups having 2 to 6 carbon atoms, such as an ethylene group, an n-propylene group, an isopropylene group, and a butylene group; and alkylene groups having 2 to 9 carbon atoms and having an oxygen atom of an ether bond in the structure, such as an oxyethylene group, an oxy-n-propylene group, an oxyisopropylene group, and an oxybutylene group, are preferred. To further reduce the viscosity of the composition and further improve the curability of the composition, a compound having a glycol ether chain where $R^2$ is an alkylene group having 2 to 9 carbon atoms and having an oxygen atom of an ether bond in the structure, such as an oxyethylene group, an oxy n-propylene group, an oxyisopropylene group, and an oxybutylene group, is more preferred.

The monovalent organic residue having 1 to 11 carbon atoms and represented by $R^3$ in formula (1) above is preferably an optionally substituted linear, branched, or cyclic alkyl group having 1 to 10 carbon atoms, or an optionally substituted aromatic group having 6 to 11 carbon atoms. Among these, an alkyl group having 1 to 2 carbon atoms, such as a methyl group or an ethyl group, or an aromatic group having 6 to 8 carbon atoms, such as a phenyl group or a benzyl group, is preferably used.

When the above organic residues are each optionally substituted groups, the substituents are classified into groups containing a carbon atom and groups containing no carbon atom. First, when the substituent is a group containing a carbon atom, the carbon atom is counted as the number of carbon atoms of the organic residue. Examples of the group containing a carbon atom include, but are not limited to, a carboxyl group and an alkoxy group. Next, examples of the group containing no carbon atom include, but are not limited to, a hydroxyl group and a halo group.

Specific examples of the compound of formula (1) include, but are not limited to, 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethyl propyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(2-vinyloxyethoxy)ethyl methacrylate, 2-(2-vinyloxyethoxy)ethyl acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy) isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy) ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth)acrylate, polyethylene glycol monovinyl ether (meth)acrylate, and polypropylene glycol monovinyl ether (meth)

acrylate. Among these specific examples, 2-(2-vinyloxyethoxy)ethyl acrylate is particularly preferred in order to easily make a balance between the curability and the viscosity of the composition. In this embodiment, 2-(2-vinyloxyethoxy)ethyl acrylate may also be referred to as VEEA.

The amount of the vinyl ether group-containing (meth)acrylate is preferably from 0.5 to 10 mass %, more preferably from 1 to 7.5 mass %, and still more preferably from 2 to 5 mass %, relative to the total amount of the polymerizable compounds. When the amount of the vinyl ether group-containing (meth)acrylate relative to the total amount of the polymerizable compounds is in the above range, the composition tends to have low viscosity and higher curability.

The amount of the vinyl ether group-containing (meth)acrylate is preferably from 0.5 to 10 mass %, more preferably from 1 to 7.5 mass %, and still more preferably from 2 to 5 mass %, relative to the total amount of the composition. When the amount of the vinyl ether group-containing (meth)acrylate relative to the total amount of the composition is in the above range, the composition tends to have low viscosity and higher curability.

2.1.2.2. Bifunctional (Meth)Acrylate

Examples of bifunctional (meth)acrylates include, but are not limited to, dipropylene glycol diacrylate (DPGDA), diethylene glycol di(meth)acrylate, triethylene glycol di(meth)acrylate, tetraethylene glycol di(meth)acrylate, polyethylene glycol di(meth)acrylate, dipropylene glycol dimethacrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, ethylene oxide (EO) adduct di(meth)acrylate of bisphenol A, propylene oxide (PO) adduct di(meth)acrylate of bisphenol A, hydroxypivalic acid neopentyl glycol di(meth)acrylate, and polytetramethylene glycol di(meth)acrylate.

2.1.2.3. Tri- or Higher-Functional (Meth)Acrylate

Examples of tri- or higher-functional (meth)acrylates include, but are not limited to, trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerol propoxy tri(meth)acrylate, caprolactone-modified trimethylolpropane tri(meth)acrylate, pentaerythritolethoxy tetra(meth)acrylate, and caprolactam-modified dipentaerythritol hexa(meth)acrylate.

2.2.3. Oligomer

The oligomer according to this embodiment is a multimer, such as dimer or trimer, having a polymerizable compound as a constituent and is a compound having one or more polymerizable functional groups. The term "polymerizable compound" herein is not limited to the foregoing monofunctional monomers and the foregoing multifunctional monomers. In this embodiment, polymerizable compounds having a molecular weight of 1000 or more are defined as oligomers, and polymerizable compounds having a molecular weight of 1000 or less are defined as monomers.

Examples of the oligomer include, but are not limited to, urethane acrylate oligomers including urethane as a repeating structure, polyester acrylate oligomers including ester as a repeating structure, and epoxy acrylate oligomers including epoxy as a repeating structure.

Among these, urethane acrylate oligomers are preferred, aliphatic urethane acrylate oligomers and aromatic urethane acrylate oligomers are more preferred, and aliphatic urethane acrylate oligomers are still more preferred. Urethane acrylate oligomers are preferably tetra- or lower-functional urethane acrylate oligomers and more preferably bifunctional urethane acrylate oligomers.

The use of such an oligomer tends to further improve the storage stability of the composition and further improve rub fastness.

The amount of the oligomer is preferably from 1 to 10 mass %, more preferably from 3 to 9 mass %, and still more preferably from 5 to 7 mass %, relative to the total amount of the polymerizable compounds. When the amount of the oligomer relative to the total amount of the polymerizable compounds is in the above range, the composition tends to have higher storage stability, and the coating film tends to have higher rub fastness.

The amount of the oligomer is preferably from 1 to 10 mass %, more preferably from 3 to 9 mass %, and still more preferably from 5 to 7 mass %, relative to the total amount of the composition. When the amount of the oligomer relative to the total amount of the composition is in the above range, the composition tends to have higher storage stability, and the coating film tends to have higher rub fastness.

2.2. Polymerization Initiator

The radiation-curable ink jet composition according to this embodiment preferably contains a polymerization initiator that generates an active species upon irradiation with radiation. The polymerization initiator may be used alone or in combination of two or more.

Examples of the polymerization initiator include, but are not limited to, known polymerization initiators, such as acylphosphine oxide polymerization initiators, alkylphenone polymerization initiators, titanocene polymerization initiators, and thioxanthone polymerization initiators. Among these, acylphosphine oxide polymerization initiators are preferred. The use of these polymerization initiators tends to further improve the curability of the composition, especially the curability in the curing process with UV-LED light.

Examples of acylphosphine oxide polymerization initiators include, but are not limited to, 2,4,6-trimethylbenzoyl diphenylphosphine oxide, bis(2,4,6-trimethylbenzoyl)-phenylphosphine oxide, and bis-(2,6-dimethoxybenzoyl)-2,4,4-trimethylpentyl phosphine oxide.

Examples of commercial products of such acylphosphine oxide polymerization initiators include Omnirad 819 (bis(2,4,6-trimethylbenzoyl)-phenylphosphine oxide), IRGACURE 1800 (a mixture of bis-(2,6-dimethoxybenzoyl)-2,4,4-trimethylpentylphosphine oxide and 1-hydroxy-cyclohexyl-phenyl ketone in a mass ratio of 25:75), and SpeedCure TPO (2,4,6-trimethylbenzoyl diphenylphosphine oxide).

These polymerization initiators may be used together with a sensitizer, such as SpeedCure DETX (2,4-diethylthioxanthen-9-one).

The amount of the polymerization initiator is preferably from 5 to 20 mass %, more preferably from 7.5 to 17.5 mass %, and still more preferably from 10 to 15 mass %, relative to the total amount of the composition. When the amount of the polymerization initiator is in the above range, the curability of the composition and the solubility of the polymerization initiator tend to be further improved.

2.3. Other Additives

The radiation-curable ink jet composition according to this embodiment may further contain additives, such as a colorant, a dispersant, a polymerization inhibitor, a slip agent, and a photosensitizer, as necessary.

2.3.1. Colorant

The radiation-curable ink jet composition according to this embodiment may further contain a colorant. The radiation-curable ink jet composition according to this embodiment containing a colorant can be used as a colored radiation-curable ink jet composition. The colorant may be at least one of a pigment and a dye.

The total amount of the colorant is preferably from 1 to 20 mass %, more preferably from 1 to 15 mass %, and still more preferably from 1 to 10 mass %, relative to the total amount of the composition. The radiation-curable ink jet composition according to this embodiment may be a clear ink that does not contain a colorant or contains a colorant in an amount not intended for coloring (e.g., in an amount of 0.1 mass % or less).

2.3.1.1. Pigment

The use of a pigment as a colorant can improve the light resistance of the radiation-curable ink jet composition. The pigment may be either an inorganic pigment or an organic pigment. The pigment may be used alone or in combination of two or more.

Examples of inorganic pigments that can be used include carbon black (Colour Index (C.I.) Generic Name Pigment Black 7), such as furnace black, lamp black, acetylene black, and channel black; iron oxide; and titanium oxide.

Examples of organic pigments include azo pigments, such as insoluble azo pigments, condensed azo pigments, azo lakes, and chelate azo pigments; polycyclic pigments, such as phthalocyanine pigments, perylene and perinone pigments, anthraquinone pigments, quinacridone pigments, dioxane pigments, thioindigo pigments, isoindolinone pigments, and quinophthalone pigments; dye chelates (e.g., basic dye chelates and acid dye chelates); dye lakes (basic dye lakes and acid dye lakes); nitro pigments, nitroso pigments, aniline black, and daylight fluorescent pigments.

Specific examples of carbon black used for black include No. 2300, No. 900, MCF 88, No. 33, No. 40, No. 45, No. 52, MA 7, MA 8, MA 100, No. 2200B, and the like (these products are available from Mitsubishi Chemical Corporation); Raven 5750, Raven 5250, Raven 5000, Raven 3500, Raven 1255, Raven 700, and the like (these products are available from Carbon Columbia); Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (available from Cabot Japan K.K.); and Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, and Special Black 4 (these products are available from Degussa AG).

Examples of pigments used for white include C.I. Pigment White 6, 18, and 21.

Examples of pigments used for yellow include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, and 180.

Examples of pigments used for magenta include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C.I. Pigment Violet 19, 23, 32, 33, 36, 38, 43, and 50.

Examples of pigments used for cyan include C.I. Pigment Blue 1, 2, 3, 15, 15:1, 15:2, 15:3, 15:34, 15:4, 16, 18, 22, 25, 60, 65, and 66, and C.I. Vat Blue 4 and 60.

Examples of pigments other than pigments for magenta, cyan, and yellow include C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

The amount of the pigment is preferably from 1 to 20 mass %, more preferably from 1 to 15 mass %, and still more preferably from 1 to 10 mass %, relative to the total amount of the composition.

2.3.1.2. Dye

The colorant may be a dye. Examples of the dye that can be used include, but are not limited to, acid dyes, direct dyes, reactive dyes, and basic dyes. The dye may be used alone or in combination of two or more.

Examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

2.3.2. Dispersant

When the radiation-curable ink jet composition contains a pigment, the composition may further contain a dispersant in order to improve pigment dispersibility. The dispersant may be used alone or in combination of two or more.

Examples of the dispersant include, but are not limited to, dispersants commonly used for preparing a pigment dispersion, such as a polymer dispersant. Specific examples include dispersants containing, as a main component, one or more selected from polyoxyalkylene polyalkylene polyamines, vinyl polymers and copolymers, acrylic polymers and copolymers, polyesters, polyamides, polyimides, polyurethanes, amino polymers, silicon-containing polymers, sulfur-containing polymers, fluorine-containing polymers, and epoxy resins.

Examples of commercial products of polymer dispersants include AJISPER series available from Ajinomoto Fine-Techno Co., Inc., Solsperse series (e.g., Solsperse 36000) available from Avecia, Inc. or Noveon, Inc., DISPERBYK series available from BYK Additives & Instruments, and DISPARLON series available from Kusumoto Chemicals, Ltd.

The amount of the dispersant is preferably from 0.05 to 2 mass %, more preferably from 0.05 to 1 mass %, and still more preferably from 0.05 to 0.5 mass %, relative to the total amount of the composition.

2.3.3. Polymerization Inhibitor

The radiation-curable ink jet composition according to this embodiment may further contain a polymerization inhibitor. The polymerization inhibitor may be used alone or in combination of two or more.

Examples of the polymerization inhibitor include, but are not limited to, p-methoxyphenol, hydroquinone monomethyl ether (MEHQ), 4-hydroxy-2,2,6,6-tetramethylpiperidin-N-oxyl, hydroquinone, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), 4,4'-thiobis(3-methyl-6-t-butylphenol), hindered amine compounds, and 2,2,6,6-tetramethyl-4-hydroxypiperidin-1-oxyl (LA-7RD available from Adeka Corporation).

The amount of the polymerization inhibitor is preferably from 0.05 to 1 mass %, more preferably from 0.05 to 0.5 mass %, relative to the total amount of the composition.

2.3.4. Slip Agent

The radiation-curable ink jet composition according to this embodiment may further contain a slip agent. The slip agent may be used alone or in combination of two or more.

The slip agent is preferably a silicone surfactant, and more preferably a polyester-modified silicone or a polyether-modified silicone. Examples of the polyether-modified silicone include BYK-378, BYK-3455, BYK-UV 3500, BYK-UV 3510, and BYK-UV 3530 (these products are available from BYK Additives & Instruments). Examples of the polyester-modified silicone include BYK-3570 (available from BYK Additives & Instruments).

The amount of the slip agent is preferably from 0.01 to 2 mass %, and more preferably from 0.05 to 1 mass %, relative to the total amount of the composition.

2.3.5. Photosensitizer

The radiation-curable ink jet composition according to this embodiment may further contain a photosensitizer. Examples of the photosensitizer include amine compounds (e.g., aliphatic amines, aromatic group-containing amines, piperidine, reaction products between epoxy resins and amines, and triethanolamine triacrylate), urea compounds (e.g., allyl thiourea and o-tolylthiourea), sulfur compounds (e.g., sodium diethyl dithiophosphate, soluble salts of aromatic sulfinic acids), nitrile compounds (e.g., N,N-diethyl-p-aminobenzonitrile), phosphorus compounds (e.g., tri-n-butylphosphine and sodium diethyldithiophosphide), nitrogen compounds (e.g., Michler's ketone, N-nitrosohydroxylamine derivatives, oxazolidine compounds, tetrahydro-1,3-oxazine compound, and a condensate of diamine and formaldehyde or acetaldehyde), and chlorine compounds (e.g., carbon tetrachloride and hexachloroethane).

2.4. Method for Manufacturing Composition

The radiation-curable ink jet composition is manufactured (prepared) by mixing components to be contained in the composition and stirring the mixture so as to sufficiently uniformly mix the components. In this embodiment, the process for preparing the radiation-curable ink jet composition preferably includes a step of subjecting a mixture of the polymerization initiator and at least some of monomers to at least one of an ultrasonic treatment and a heat treatment. This step can reduce the amount of oxygen dissolved in the prepared composition and enables the radiation-curable ink jet composition to have high discharge stability and high storage stability. The mixture contains at least the above components. The mixture may further contain other components to be contained in the radiation-curable ink jet composition or may contain all components to be contained in the radiation-curable ink jet composition. The mixture contains at least some of monomers to be contained in the radiation-curable ink jet composition.

3. Ink Jet Apparatus

An ink jet apparatus according to an embodiment includes: an ink jet head having a nozzle density of 600 npi or more and configured to discharge the composition onto a recording medium at an ink weight per dot of 22 ng/dot or less; and a radiation source that emits radiation to the composition attached to the recording medium. The radiation-curable ink jet composition is used as a composition.

The ink jet apparatus according to this embodiment may use a line system or a serial system. However, the ink jet apparatus preferably uses a serial system including a carriage carrying an ink jet head. The ink jet head discharges the radiation-curable ink jet composition when the carriage is scanned in the width direction of a recording medium. In particular, in the case of a serial ink jet head, a carriage carrying an ink jet head preferably further carries a radiation source disposed adjacent to the ink jet head in the scanning direction of the ink jet head. This configuration achieves high-speed printing and enables the obtained recorded article to have high definition and high color development in this embodiment as described above.

Figure 2:
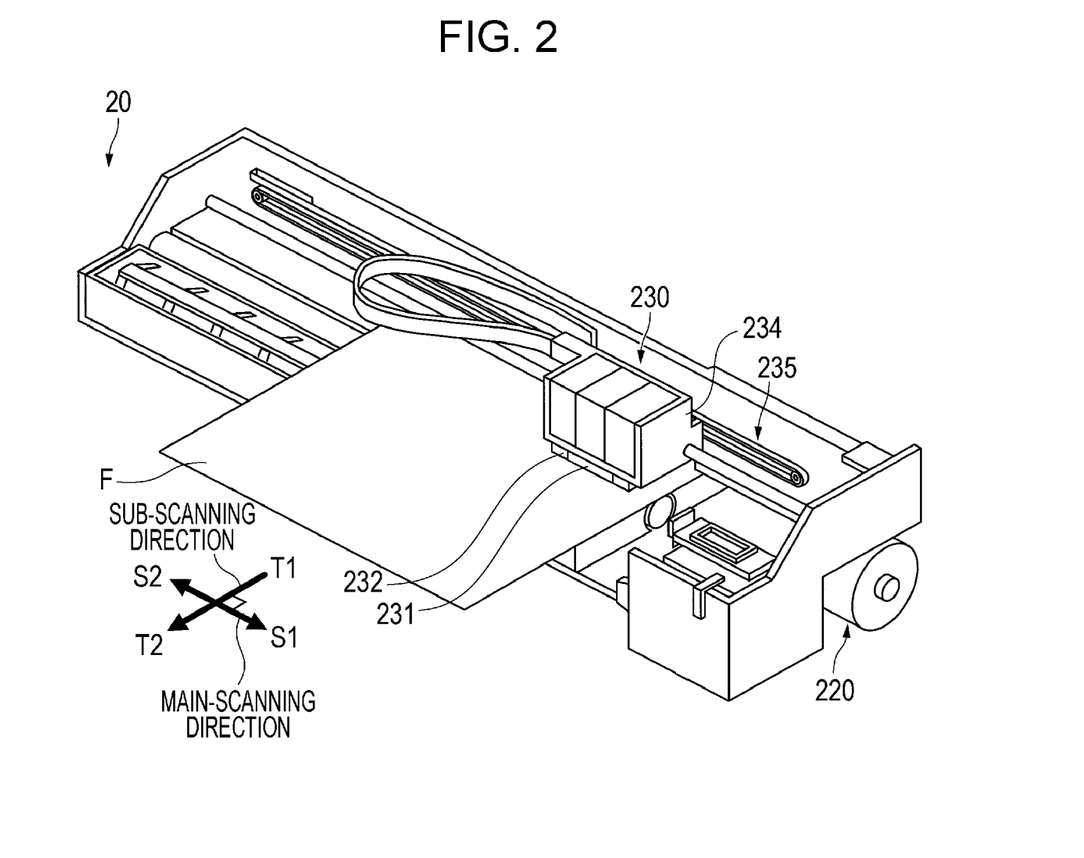
FIG. 2 is a perspective view of a serial ink jet apparatus in an embodiment.

FIG. 2 is a perspective view of a serial printer, which is an example ink jet apparatus. As shown in FIG. 2, a serial printer 20 includes a transport unit 220 and a recording unit 230. The transport unit 220 transports, to the recording unit 230, a recording medium F fed to the serial printer and discharges the recording medium to the outside of the serial printer after recording. Specifically, the transport unit 220 has feed rollers and transports the fed recording medium F in a sub-scanning direction T1.

The recording unit 230 includes an ink jet head 231, which discharges the composition onto the recording medium F fed from the transport unit 220; a radiation source 232, which emits radiation to the attached composition; a carriage 234, which carries the ink jet head 231 and the radiation source 232; and a carriage movement mechanism 235, which moves the carriage 234 in the main-scanning directions S1 and S2 of the recording medium F.

A serial printer includes, as the ink jet head 231, a head having a length smaller than the width of a recording medium and performs multiple pass (multi-pass) recording as the head moves. In a serial printer, the carriage 234 which moves in predetermined directions carries the head 231 and the radiation source 232, and the composition is discharged onto the recording medium as the head moves in conjunction with the movement of the carriage. Recording with two passes or more (multi-pass) is performed accordingly. The pass is also referred to as main scanning. Sub-scanning for transporting the recording medium is performed between passes. In other words, main scanning alternates with sub-scanning.

FIG. 2 shows the radiation source carried by the carriage, but the present disclosure is not limited to this configuration. The printer may include a radiation source that is not carried by the carriage.

The ink jet apparatus according to this embodiment is not limited to the above serial printer and may be the above line printer.

4. Recorded Article

A recorded article according to an embodiment is obtained by attaching the radiation-curable ink jet composition to a recording medium and curing the radiation-curable ink jet composition. The composition having high flexibility and high adhesion can prevent cracking and chipping of a coating film in post-processing such as cutting or bending. The recorded article according to this embodiment can thus be preferably used for sign applications.

Examples of the material of the recording medium include, but are not limited to, plastics, such as polyvinyl chloride, polyethylene terephthalate, polypropylene, polyethylene, polycarbonate, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal; surface-treated products of these plastics; glass, paper, metal, and wood.

The form of the recording medium is not limited either. Examples of the form include films, boards, and fabrics.

EXAMPLES

The present disclosure will be described below in more detail by way of Examples. The present disclosure is not limited by Examples below.

1. Preparation of Ink Jet Composition

First, a colorant, a dispersant, and part of each monomer were weighed and placed in a pigment dispersion tank, and ceramic beads having a diameter of 1 mm were placed in the tank. The mixture was stirred to form a pigment dispersion in which the colorant was dispersed in the monomers. Next, the remaining monomers, a polymerization initiator, and a polymerization inhibitor were placed in a mixture tank, which was a stainless steel container, so as to obtain the composition described in Table 1. The mixture was mixed and stirred to complete dissolution. Subsequently, the pigment dispersion formed as described above was placed in the mixture tank, and the mixture was further mixed and stirred at normal temperature for 1 hour and then filtered through a 5 μm membrane filter to obtain a radiation-curable ink jet composition in Example. The value for each component shown in Examples in Table is on a mass % basis.

TABLE 1

|  |  |  | Tg (° C.) | Example 1 | Example 2 | Example 3 |
|---|---|---|---|---|---|---|
| Composition (mass %) | Monofunctional monomer | NVC | 90 |  |  |  |
|  |  | ACMO | 145 | 12.0 | 12.0 | 12.0 |
|  |  | PEA | −22 | 33.0 | 33.0 | 33.0 |
|  |  | IBXA | 94 | 26.0 | 26.0 | 26.0 |
|  |  | TBCHA | 10 |  |  |  |
|  |  | DCPA | 110 | 5.0 | 5.0 | 5.0 |
|  |  | Dicyclopentanyl acrylate | 120 |  |  |  |
|  | Multifunctional monomer | VEEA | 39 | 3.0 | 3.0 | 3.0 |
|  | Oligomer | CN991 | 27 | 5.6 | 5.6 | 5.6 |
|  | Polymerization inhibitor | MEHQ | — | 0.2 | 0.2 | 0.2 |
|  |  | LA-7RD | — | 0.1 | 0.1 | 0.1 |
|  | Polymerization initiator | Omnirad 819 | — | 5.0 | 5.0 | 5.0 |
|  |  | Speedcure TPO | — | 4.8 | 4.8 | 4.8 |
|  | Sensitizer | Speedcure DETX | — | 2.8 | 2.8 | 2.8 |
|  | Slip agent | BYK-UV3500 | — | 0.5 | 0.5 | 0.5 |
|  | Dispersant | solsperse36000 | — | 0.1 | 0.1 | 0.1 |
|  | Pigment | Carbon black | — | 1.9 | 1.9 | 1.9 |
|  | Total |  | — | 100.0 | 100.0 | 100.0 |
| Physical properties | Proportion (mass %) of monofunctional monomer in composition |  | — | 76.0 | 76.0 | 76.0 |
|  | Proportion (mass %) of monofunctional monomer in polymerizable compounds |  | — | 90% | 90% | 90% |
|  | Proportion (mass %) of multifunctional monomer in polymerizable compounds |  | — | 10% | 10% | 10% |
|  | Proportion (mass %) of nitrogen-containing monofunctional monomer in composition |  | — | 12.0 | 12.0 | 12.0 |
|  | Proportion (mass %) of nitrogen-containing monofunctional monomer in polymerizable compounds |  | — | 14% | 14% | 14% |
|  | Weighted mean (° C.) of glass transition temperatures |  | — | 50.5 | 50.5 | 50.5 |
| Recording conditions | Ink jet head: dot density dischargeable in one scan |  | — | 600 dpi | 600 dpi | 600 dpi |
|  | Printed image resolution dpi |  | — | 600 × 600 | 600 × 600 | 1200 × 1200 |
|  | Ink weight per dot ng |  | — | 19 | 22 | 5 |
| Evaluation items | Adhesion |  | — | A | A | A |
|  | Rub fastness |  | — | A | A | A |
|  | L* (indicator of color development) |  | — | A | A | A |
|  | 4-Point character quality |  | — | AA | A | AA |
|  | Printing speed |  | — | AA | AA | A |

|  |  |  | Comparative Example 1 | Comparative Example 2 | Comparative Example 3 | Comparative Example 4 |
|---|---|---|---|---|---|---|
| Composition (mass %) | Monofunctional monomer | NVC |  |  | 27.0 | 9.0 |
|  |  | ACMO | 12.0 | 12.0 | 12.0 | 20.0 |
|  |  | PEA | 33.0 | 33.0 | 36.0 | 37.0 |
|  |  | IBXA | 26.0 | 26.0 |  |  |
|  |  | TBCHA |  |  | 3.0 |  |
|  |  | DCPA | 5.0 | 5.0 |  |  |
|  |  | Dicyclopentanyl acrylate |  |  |  |  |
|  | Multifunctional monomer | VEEA | 3.0 | 3.0 | 1.0 | 13.0 |
|  | Oligomer | CN991 | 5.6 | 5.6 | 5.6 | 5.6 |
|  | Polymerization | MEHQ | 0.2 | 0.2 | 0.2 | 0.2 |

TABLE 1-continued

|  |  |  | | | | |
|---|---|---|---|---|---|---|
| | inhibitor | LA-7RD | 0.1 | 0.1 | 0.1 | 0.1 |
| | Polymerization | Omnirad 819 | 5.0 | 5.0 | 5.0 | 5.0 |
| | initiator | Speedcure TPO | 4.8 | 4.8 | 4.8 | 4.8 |
| | Sensitizer | Speedcure DETX | 2.8 | 2.8 | 2.8 | 2.8 |
| | Slip agent | BYK-UV3500 | 0.5 | 0.5 | 0.5 | 0.5 |
| | Dispersant | solsperse36000 | 0.1 | 0.1 | 0.1 | 0.1 |
| | Pigment | Carbon black | 1.9 | 1.9 | 1.9 | 1.9 |
| | Total | | 100.0 | 100.0 | 100.0 | 100.0 |
| Physical properties | Proportion (mass %) of monofunctional monomer in composition | | 76.0 | 76.0 | 78.0 | 66.0 |
| | Proportion (mass %) of monofunctional monomer in polymerizable compounds | | 90% | 90% | 92% | 78% |
| | Proportion (mass %) of multifunctional monomer in polymerizable compounds | | 10% | 10% | 8% | 22% |
| | Proportion (mass %) of nitrogen-containing monofunctional monomer in composition | | 12.0 | 12.0 | 39.0 | 29.0 |
| | Proportion (mass %) of nitrogen-containing monofunctional monomer in polymerizable compounds | | 14% | 14% | 46% | 34% |
| | Weighted mean (° C.) of glass transition temperatures | | 50.5 | 50.5 | 42.5 | 42.0 |
| Recording conditions | Ink jet head: dot density dischargeable in one scan | | 600 dpi | 300 dpi | 600 dpi | 600 dpi |
| | Printed image resolution dpi | | 600 × 600 | 600 × 600 | 600 × 600 | 600 × 600 |
| | Ink weight per dot ng | | 27 | 19 | 19 | 19 |
| Evaluation items | Adhesion | | A | A | A | C |
| | Rub fastness | | A | A | A | AA |
| | L* (indicator of color development) | | AA | A | B | B |
| | 4-Point character quality | | B | AA | AA | AA |
| | Printing speed | | AA | B | AA | AA |

| | | | Comparative Example | | | |
|---|---|---|---|---|---|---|
| | | | 5 | 6 | 7 | 8 |
| Composition (mass %) | Monofunctional monomer | NVC | 9.0 | 9.0 | 27.0 | |
| | | ACMO | 20.0 | 20.0 | | 12.0 |
| | | PEA | 37.0 | 37.0 | 35.0 | 37.0 |
| | | IBXA | | | | 22.0 |
| | | TBCHA | | | 3.0 | |
| | | DCPA | | | | 4.0 |
| | | Dicyclopentanyl acrylate | | | 13.0 | |
| | Multifunctional monomer | VEEA | 13.0 | 13.0 | 1.0 | 3.0 |
| | Oligomer | CN991 | 5.6 | 5.6 | 5.6 | 6.6 |
| | Polymerization inhibitor | MEHQ | 0.2 | 0.2 | 0.2 | 0.2 |
| | | LA-7RD | 0.1 | 0.1 | 0.1 | 0.1 |
| | Polymerization initiator | Omnirad 819 | 5.0 | 5.0 | 5.0 | 5.0 |
| | | Speedcure TPO | 4.8 | 4.8 | 4.8 | 4.8 |
| | Sensitizer | Speedcure DETX | 2.8 | 2.8 | 2.8 | 2.8 |
| | Slip agent | BYK-UV3500 | 0.5 | 0.5 | 0.5 | 0.5 |
| | Dispersant | solsperse36000 | 0.1 | 0.1 | 0.1 | 0.1 |
| | Pigment | Carbon black | 1.9 | 1.9 | 1.9 | 1.9 |
| | Total | | 100.0 | 100.0 | 100.0 | 100.0 |
| Physical properties | Proportion (mass %) of monofunctional monomer in composition | | 66.0 | 66.0 | 78.0 | 75.0 |
| | Proportion (mass %) of monofunctional monomer in polymerizable compounds | | 78% | 78% | 92% | 89% |
| | Proportion (mass %) of multifunctional monomer in polymerizable compounds | | 22% | 22% | 8% | 11% |
| | Proportion (mass %) of nitrogen-containing monofunctional monomer in composition | | 29.0 | 29.0 | 27.0 | 12.0 |
| | Proportion (mass %) of nitrogen-containing monofunctional monomer in polymerizable compounds | | 34% | 34% | 32% | 14% |
| | Weighted mean (° C.) of glass transition temperatures | | 42.0 | 42.0 | 40.7 | 44.1 |
| Recording conditions | Ink jet head: dot density dischargeable in one scan | | 600 dpi | 600 dpi | 600 dpi | 600 dpi |
| | Printed image resolution dpi | | 600 × 600 | 600 × 600 | 600 × 600 | 600 × 600 |
| | Ink weight per dot ng | | 22 | 25 | 19 | 19 |

TABLE 1-continued

| Evaluation items | | | | | |
|---|---|---|---|---|---|
| Evaluation items | Adhesion | C | C | A | A |
| | Rub fastness | AA | AA | B | B |
| | L* (indicator of color development) | B | AA | A | AA |
| | 4-Point character quality | A | B | AA | AA |
| | Printing speed | AA | AA | AA | AA |

The abbreviations and the components of products used in Table 1 are as described below.

Monofunctional Monomer
NVC (available from ISP Japan, Ltd., N-vinylcaprolactam)
ACMO (available from KJ Chemicals Corporation, acryloylmorpholine)
PEA (trade name "Viscoat #192" available from Osaka Organic Chemical Industry Ltd., phenoxyethyl acrylate)
IBXA (available from Osaka Organic Chemical Industry Ltd., isobornyl acrylate)
TBCHA (trade name "SR217" available from Sartomer, tert-butylcyclohexanol acrylate)
DCPA (available from Hitachi Chemical Co., Ltd., dicyclopentenyl acrylate)
Dicyclopentanyl acrylate (available from Hitachi Chemical Co., Ltd.)
Multifunctional Monomer
VEEA (available from Nippon Shokubai Co., Ltd., 2-(2-vinyloxyethoxy)ethyl acrylate)
Oligomer
CN991 (available from Sartomer, bifunctional urethane acrylate oligomer)
Polymerization Inhibitor
MEHQ (trade name "p-methoxyphenol" available from Kanto Chemical Co., Inc., hydroquinone monomethyl ether)
LA-7RD (available from Adeka Corporation, 2,2,6,6-tetramethyl-4-hydroxypiperidin-1-oxyl)
Polymerization Initiator
Omnirad 819 (trade name "Omnirad 819" available from IGM Resins, bis(2,4,6-trimethylbenzoyl)-phenylphosphine oxide)
SpeedCure TPO (trade name "SpeedCure TPO" available from Lambson, 2,4,6-trimethylbenzoyl diphenylphosphine oxide)
Sensitizer
SpeedCure DETX (trade name "SpeedCure DETX" available from Lambson, 2,4-diethylthioxanthen-9-one)
Slip Agent
BYK-UV 3500 (available from BYK Additives & Instruments, acryloyl group-containing polyether-modified polydimethylsiloxane)
Dispersant
Solsperse 36000 (available from The Lubrizol Corporation, polymer dispersant)
Colorant (Pigment)
Carbon black (trade name "MA-100" available from Mitsubishi Chemical Corporation)

2. Evaluation Method 2.1. Evaluation of Adhesion

Each radiation-curable ink jet composition was applied to a polypropylene board (available from Coroplast, Inc.) by using a bar coater such that the thickness of the composition was 10 μm. Next, the composition was cured by using an LED lamp at an energy of 400 mJ/cm² to form a coating film. The obtained coating film was evaluated in the cross-cut test in accordance with JIS K5600-5-6.

More specifically, a 10×10 grid pattern was formed by making cross-cuts at intervals of 1 mm using a cutter with the blade of the cutting tool placed on the coating film at right angles. A transparent adhesive tape (25 mm wide) having a length of about 75 mm was attached to the grid, and the tape was rubbed with a finger sufficiently so as to allow the cured film to be seen through the tape. Next, the tape was assuredly peeled off from the cured film at an angle near 60° in 0.5 to 1.0 seconds within 5 minutes after the tape was attached, and the grid condition was visually observed. The evaluation criteria are as described below.

Evaluation Criteria
  A: No peeling of the cured film is observed in the grid.
  B: Peeling of the cured film is observed in less than 50% of the grid.
  C: Peeling of the cured film is observed in 50% or more of the grid.

2.2. Evaluation of Rub Fastness

Each radiation-curable ink jet composition was applied to a PVC film (JT 5829 R available from Mactac) by using a bar coater such that the thickness of the composition was 10 μm. Next, the composition was cured by using a metal halide lamp (available from Eye Graphics Co., Ltd.) at an energy of 400 mJ/cm² to form a coating film. The coating film after curing was evaluated in the micro-scratch test in accordance with JIS R3255. The withstand load indicating rub fastness was measured by using a nano-layer scratch tester (CSR-5000 available from Nanotec Corporation). The withstand load was the load under which the stylus reached the medium surface in creating micro-scratches under load. The measurement was performed under the conditions: stylus diameter 15 μm, amplitude 100 μm, and scratch speed 10 μm/sec. The evaluation criteria are as described below.

Evaluation Criteria
  AA: 30 mN/cm² or more
  A: 25 mN/cm² or more and less than 30 mN/cm²
  B: 20 mN/cm² or more and less than 25 mN/cm²

2.3. Color Development

The L* value of the coating film obtained in the evaluation of curability was measured by using a spectrophotometer (trade name "GretagMacbeth Spectrolino" available from X-Rite, Inc.). The cured coating film was used. The evaluation criteria are as described below.

Evaluation Criteria
  AA: Less than 15
  A: 15 or more and less than 20
  B: 20 or more 2.4. Print Quality The print quality for the ink compositions of Examples and Comparative Examples was evaluated. First, an ink jet printer PX-G930 (Seiko Epson Corporation) including an ink jet head having the features described in Table 1 was provided. Each ink composition was charged into the ink jet printer. Next, a test pattern of a 4-point character string was printed to provide a recorded article. The obtained recorded article was visually checked and evaluated in accordance with the following criteria.

Evaluation Criteria
  AA: Less blurry and readable
  A: Some blurry but readable
  B: Smudged characters and non-readable 2.5. Printing Speed A test pattern of an image having a resolution of 600 dpi or higher in the sub-scanning direction was printed on one A4 sheet in the longitudinal direction in the same manner as in the evaluation of print quality. The number of times of scans of the head until completion of printing was evaluated in accordance with the following criteria.

Evaluation Criteria

AA: Less than 12 times
A: 12 Times or more and less than 24 times
B: 24 Times or more 3. Evaluation Results Table 1 shows the components of the radiation-curable ink jet compositions used in Examples and the evaluation results. Table 1 indicates that the recording methods according to this embodiment show good performance in terms of adhesion, rub fastness, color development, print quality, and printing speed, which are all rated A or higher.

Specifically, as Examples are compared with Comparative Examples 1 and 6, it is found that the character quality is high at an ink weight per dot of 22 ng/dot or less. As Examples are compared with Comparative Example 2, it is found that high printing speed is achieved by using an ink jet head configured to discharge ink droplets at a resolution of 600 dpi or more in one scan. As Examples are compared with Comparative Examples 3 to 8, it is found that the adhesion and color development are improved when the amount of monofunctional monomer or the amount of nitrogen-containing monofunctional monomer is in a predetermined range.

What is claimed is:

1. An ink jet method comprising:
    a discharging step of discharging a radiation-curable ink jet composition onto a recording medium at an ink weight per dot of 22 ng/dot or less by using an ink jet head configured to discharge ink droplets at a resolution of 600 dpi or more in one scan; and
    an irradiating step of irradiating, with radiation, the radiation-curable ink jet composition attached to the recording medium, wherein
    the radiation-curable ink jet composition contains polymerizable compounds including a monofunctional monomer and a multifunctional monomer,
    the monofunctional monomer includes a nitrogen-containing monofunctional monomer,
    an amount of the monofunctional monomer is 90 mass % or more relative to a total amount of the polymerizable compounds, and
    an amount of the nitrogen-containing monofunctional monomer is from 1 to 15 mass % relative to the total amount of the polymerizable compounds.

2. The ink jet method according to claim 1, wherein a weighted mean of glass transition temperatures of homopolymers of the polymerizable compounds with a content mass ratio of each of the polymerizable compounds taken as a weight is 47° C. or higher.

3. The ink jet method according to claim 1, wherein
    the discharging step involves discharging the radiation-curable ink jet composition from the ink jet head and attaching the radiation-curable ink jet composition to the recording medium while a carriage carrying the ink jet head and a radiation source disposed downstream of the ink jet head in a scanning direction is scanned in a width direction of the recording medium, and
    the irradiating step involves irradiating the radiation-curable ink jet composition attached to the recording medium in the scanning with radiation from the radiation source in the same scanning as in the discharging step.

4. The ink jet method according to claim 1, wherein the nitrogen-containing monofunctional monomer includes either N-vinylcaprolactam or acryloylmorpholine.

5. The ink jet method according to claim 1, wherein the monofunctional monomer includes one or more selected from the group consisting of phenoxyethyl acrylate, isobornyl acrylate, t-butylcyclohexyl acrylate, dicyclopentenyl acrylate, and dicyclopentanyl acrylate.

6. The ink jet method according to claim 1, wherein ultraviolet radiation is emitted from an ultraviolet light-emitting diode in the irradiating step.

7. An ink jet apparatus comprising:
    an ink jet head having a nozzle density of 600 npi or more and configured to discharge a radiation-curable ink jet composition onto a recording medium at an ink weight per dot of 22 ng/dot or less; and
    a radiation source that emits radiation to the radiation-curable ink jet composition attached to the recording medium, wherein
    the radiation-curable ink jet composition to be discharged contains polymerizable compounds containing a monofunctional monomer and a multifunctional monomer,
    the monofunctional monomer includes a nitrogen-containing monofunctional monomer,
    an amount of the monofunctional monomer is 90 mass % or more relative to a total amount of the polymerizable compounds, and
    an amount of the nitrogen-containing monofunctional monomer is from 1 to 15 mass % relative to the total amount of the polymerizable compounds.

8. The ink jet apparatus according claim 7, further comprising a carriage, wherein
    the carriage carries the ink jet head, and
    the ink jet head discharges the radiation-curable ink jet composition when the carriage is scanned in a width direction of the recording medium.

9. The ink jet apparatus according to claim 7, wherein the radiation source is carried by a carriage and disposed adjacent to the ink jet head in a scanning direction of the ink jet head.

* * * * *